US012322882B2

(12) United States Patent
Chu

(10) Patent No.: US 12,322,882 B2
(45) Date of Patent: Jun. 3, 2025

(54) COUPLED-FEED MULTI-BRANCH ANTENNA SYSTEM

(71) Applicant: ASUSTeK COMPUTER INC., Taipei (TW)

(72) Inventor: Fang-Hsien Chu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 202 days.

(21) Appl. No.: 18/328,121

(22) Filed: Jun. 2, 2023

(65) Prior Publication Data

US 2024/0113437 A1 Apr. 4, 2024

(30) Foreign Application Priority Data

Oct. 4, 2022 (TW) ................................ 111137739

(51) Int. Cl.
*H01Q 1/24* (2006.01)
*H01Q 5/364* (2015.01)
*H01Q 5/385* (2015.01)
*H01Q 9/04* (2006.01)

(52) U.S. Cl.
CPC ........... *H01Q 9/0485* (2013.01); *H01Q 5/364* (2015.01); *H01Q 5/385* (2015.01)

(58) Field of Classification Search
CPC ...... H01Q 5/364; H01Q 5/385; H01Q 1/2291; H01Q 1/245; H01Q 1/241; H01Q 1/242; H01Q 1/243; H01Q 9/42
See application file for complete search history.

(56) References Cited

U.S. PATENT DOCUMENTS

2014/0361948 A1* 12/2014 Tanaka .................. H01Q 1/243 343/861
2015/0171911 A1* 6/2015 Yang ...................... H04W 4/80 455/280
2017/0125916 A1* 5/2017 Camacho ............... H01Q 5/371
2017/0264002 A1* 9/2017 Yen .......................... H01Q 9/26
2018/0062243 A1* 3/2018 Yang .................... H01Q 1/2291
2019/0198975 A1* 6/2019 Chen ........................ H01Q 9/42
2020/0168993 A1* 5/2020 Wei .......................... H01Q 1/24
2020/0274231 A1* 8/2020 Wei ........................ H01Q 5/364
(Continued)

FOREIGN PATENT DOCUMENTS

CN 111786134 A 10/2020
TW I559615 B 11/2016

*Primary Examiner* — Awat M Salih
(74) *Attorney, Agent, or Firm* — McClure, Qualey & Rodack, LLP

(57) ABSTRACT

A coupled-feed multi-branch antenna system includes a dielectric substrate and a grounding portion, a first parasitic branch, a second parasitic branch, a first metal branch, a second metal branch, and a signal source on the dielectric substrate. The grounding portion is close to a first short side and disposed along a first long side. The first parasitic branch is close to a second short side, and includes at least one bend to extend along a second long side. One end of the second parasitic branch is connected to the grounding portion, and another end extends towards the first parasitic branch. One end of the first metal branch is on one side of the grounding portion, and another end extends towards the second short side. One end of the second metal branch is connected to the first metal branch, and another end is disposed along the second long side.

11 Claims, 10 Drawing Sheets

(56) References Cited

U.S. PATENT DOCUMENTS

| | | | | |
|---|---|---|---|---|
| 2021/0249776 | A1* | 8/2021 | Wei | H01Q 5/328 |
| 2023/0216177 | A1* | 7/2023 | Wu | H01Q 1/38<br>343/702 |

* cited by examiner

COUPLED-FEED MULTI-BRANCH ANTENNA SYSTEM

CROSS-REFERENCE TO RELATED APPLICATION

This application claims the priority benefit of Taiwan application serial No. 111137739, filed on Oct. 4, 2022. The entirety of the above-mentioned patent application is hereby incorporated by reference herein and made a part of the specification.

BACKGROUND OF THE INVENTION

Field of the Invention

The disclosure relates to a coupled-feed multi-branch antenna system capable of reducing a vertical-axis height of an antenna to satisfy a narrow bezel design requirement.

Description of the Related Art

With the evolution of technology and aesthetic design, more types of notebook computers adopt the narrow bezel screen design. In the current antenna design, due to the addition of Wi-Fi 6E, not only the original frequency bands of 2400 to 2500 MHz and 5150 to 5850 MHz but also a high frequency band of 5925 to 7125 MHz needs to be supported. Therefore, to meet requirements of antenna efficiency, a vertical-axis (axis-Y) part of an antenna designed on a screen side often needs a width greater than 6 mm to meet efficiency specifications of the antenna. However, due to the requirement of narrow bezel design, it is generally impossible to reserve a space of 6 mm for the antenna on the vertical axis around the screen. As a result, the antenna has to be designed at a front edge of a palm rest on a system side. However, due to high noise on the system side, RF personnel usually needs to add auxiliary materials such as an absorbing material, a conductive cloth, a conductive foam to reduce the impact of noise on wireless communication, thus increasing costs. In addition, since the antenna at the system side is relatively close to human body, it is often necessary to reduce a transmission power of a network interface card due to a high SAR value. However, a reduction in the transmission power causes a lower transmission volume, thereby affecting a throughput of the wireless communication.

Therefore, how to design an antenna that achieves the narrow bezel, antenna miniaturization, and bandwidth requirements at the same time is the focus of the current antenna design.

BRIEF SUMMARY OF THE INVENTION

The disclosure provides a coupled-feed multi-branch antenna system, including a dielectric substrate, a grounding portion, a first parasitic branch, a second parasitic branch, a first metal branch, a second metal branch, and a signal source. In the coupled-feed multi-branch antenna system, the dielectric substrate includes a first long side and a second long side opposite to each other and a first short side and a second short side opposite to each other. The grounding portion is located on the dielectric substrate, where the grounding portion is close to the first short side and disposed along the first long side. The first parasitic branch is located on the dielectric substrate. The first parasitic branch is close to the second short side, and includes at least one bend to extend along the second long side. The second parasitic branch is located on the dielectric substrate. An end of the second parasitic branch is connected to the grounding portion, and another end is parallel to the first long side and extends towards the first parasitic branch. The first metal branch is located on the dielectric substrate. The first metal branch includes a connection end and an open end. The connection end is located on one side of the grounding portion. The open end extends towards the second short side, causing the first metal branch to be located between the first parasitic branch and the second parasitic branch. The second metal branch is located on the dielectric substrate. One end of the second metal branch is connected to the connection end, and another end extends away from the first metal branch and is disposed along the second long side. The signal source is located on the dielectric substrate and connected to the connection end and the grounding portion of the first metal branch to receive or transmit a radio frequency signal.

Based on the above, the disclosure provides a coupled-feed multi-branch antenna system. The coupled-feed multi-branch antenna system uses a design of stacking multiple coupled-feed branches to reduce a vertical-axis height of an antenna, so as to meet a narrow bezel design requirement and expand an operable bandwidth of the antenna while the antenna is miniaturized. In this way, the antenna system supports frequency bands of 2.4 GHz, 5 GHz, and 6 GHz (2400 MHz to 2484 MHz and 5150 MHz to 7125 MHz) to effectively cover the frequency bandwidth required by the latest Wi-Fi 6E.

DETAILED DESCRIPTION OF THE EMBODIMENTS

Figure 1:
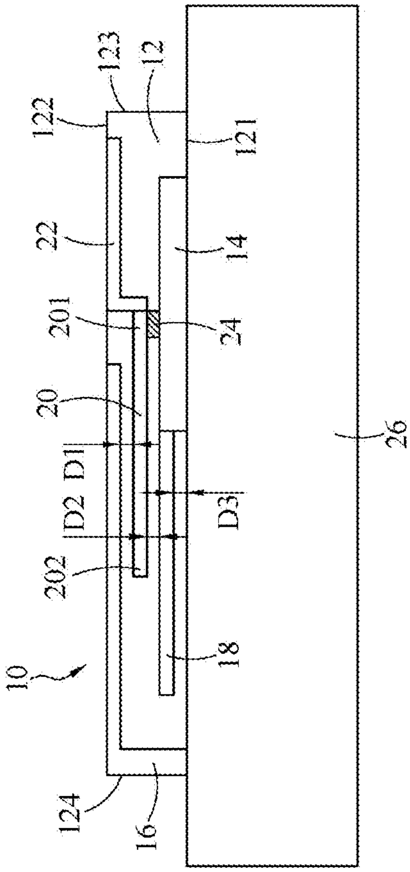
FIG. 1 is a schematic structural diagram of a coupled-feed multi-branch antenna system according to an embodiment of the disclosure.

Embodiments of the disclosure are described with reference to relevant drawings. In addition, some elements or structures may be omitted in the drawings in the embodiments, to clearly show technical features of the disclosure. In these drawings, the same reference numerals are used to refer to the same or similar elements or circuits. It is to be noted that the terms "first", "second", and the like are used herein for describing various elements, components, regions, or functions, but these elements, components, regions, and/or functions are not limited by the terms. The terms are merely used for distinguishing an element, a component, a region, or a function from another element, component, region, or function.

Referring to FIG. 1, a coupled-feed multi-branch antenna system 10 includes a dielectric substrate 12, a grounding portion 14, a first parasitic branch 16, a second parasitic branch 18, a first metal branch 20, a second metal branch 22, and a signal source 24.

As shown in FIG. 1, in the coupled-feed multi-branch antenna system 10, the dielectric substrate 12 includes a first long side 121 and a second long side 122 opposite to each other and a first short side 123 and a second short side 124 opposite to each other. The first short side 123 connects same ends of the first long side 121 and the second long side 122. The second short side 124 connects same other ends of the first long side 121 and the second long side 122. The grounding portion 14 is located on the dielectric substrate 12. The grounding portion 14 is close to the first short side 123 of the dielectric substrate 12 and disposed along the first long side 121. The first parasitic branch 16 is located on the dielectric substrate 12. The first parasitic branch 16 is close to the second short side 124, and includes at least one bend (bending towards the first short side 123) to extend along the second long side 122 and reach a position corresponding to the grounding portion 14. The second parasitic branch 18 is located on the dielectric substrate 12. One end of the second parasitic branch 18 is connected to the grounding portion 14, and another end is parallel to the first long side 121 of the dielectric substrate 12 and extends towards the first parasitic branch 16. The first metal branch 20 is located on the dielectric substrate 12. The first metal branch 20 is provided with a connection end 201 and an open end 202 at two ends respectively. The connection end 201 is close to the grounding portion 14 and located on one side of the grounding portion 14. The open end 202 extends towards the second short side 124, causing the first metal branch 20 to be located between the first parasitic branch 16 and the second parasitic branch 18. The first metal branch 20 is parallel to the first parasitic branch 16 and the second parasitic branch 18, so that a first coupling distance D1 is provided between the first metal branch 20 and the first parasitic branch 16, and a second coupling distance D2 is provided between the first metal branch 20 and the second parasitic branch 18. The second metal branch 22 is located on the dielectric substrate 12. An end of the second metal branch 22 is connected to the connection end 201 of the first metal branch 20, and another end of the second metal branch 22 bends and extends away from the first metal branch 20 and is disposed along the second long side 122. The signal source 24 is located on the dielectric substrate 12. One end of the signal source 24 is connected to the connection end 201 of the first metal branch 20, and another end is connected to the grounding portion 14, to receive or transmit a radio frequency signal by using signal transmission media such as a coaxial transmission line or a microstrip transmission line.

In an embodiment, as shown in FIG. 1, the coupled-feed multi-branch antenna system 10 further includes a system grounding surface 26. The system grounding surface 26 is adjacent to the first long side 121 of the dielectric substrate 12, so that the system grounding surface 26 is closely disposed along the first long side 121. The grounding portion 14 and the first parasitic branch 16 are connected to the system grounding surface 26, so as to be connected to the ground through the system grounding surface 26. In this case, a third coupling distance D3 is provided between the second parasitic branch 18 and the system grounding surface 26. In an embodiment, the system grounding surface 26 is an independent metal piece or a metal layer, or a metal plane located in an electronic device. In an embodiment, the system grounding surface 26 is a metal frame of the electronic device or a metal piece or a sputtered metal portion inside a case of the electronic device. In an embodiment, when the electronic device is a notebook computer, the system grounding surface 26 is a system grounding surface of a screen of the notebook computer or a metal portion, such as an EMI aluminum foil or a sputtered metal region, inside a case of the screen of the notebook computer.

As shown in FIG. 1, the densely stacked first parasitic branch 16, first metal branch 20, second parasitic branch 18, grounding portion 14, and system grounding surface 26 effectively reduces a vertical-axis (axis-Y) width of the coupled-feed multi-branch antenna system 10. In addition, coupling energy of a radio frequency signal coupled to the coupled-feed multi-branch antenna system 10 is adjusted by adjusting the first coupling distance D1, the second coupling distance D2, and the third coupling distance D3. In an embodiment, the first coupling distance D1 ranges from 1 mm to 0.25 mm, the second coupling distance D2 ranges from 1 mm to 0.25 mm, and the third coupling distance D3 ranges from 1 mm to 0.25 mm. In this embodiment, the first coupling distance D1, the second coupling distance D2, and the third coupling distance D3 are 0.5 mm. Therefore, the vertical-axis width of the coupled-feed multi-branch antenna system 10 is reduced to 3 mm. Based on this, the coupled-feed multi-branch antenna system 10 according to the disclosure is suitable for application on an electronic device with a slim bezel. The electronic device is a mobile phone, a personal digital assistant, a tablet computer, a notebook computer, or the like. Any portable electronic device with a mobile communication function is covered in the disclosure.

In an embodiment, as shown in FIG. 1, the grounding portion 14, the first parasitic branch 16, the second parasitic branch 18, the first metal branch 20, the second metal branch 22, and other components are made of a conductive metal material, such as silver, copper, aluminum, iron, an alloy thereof, or the like.

Figure 2:
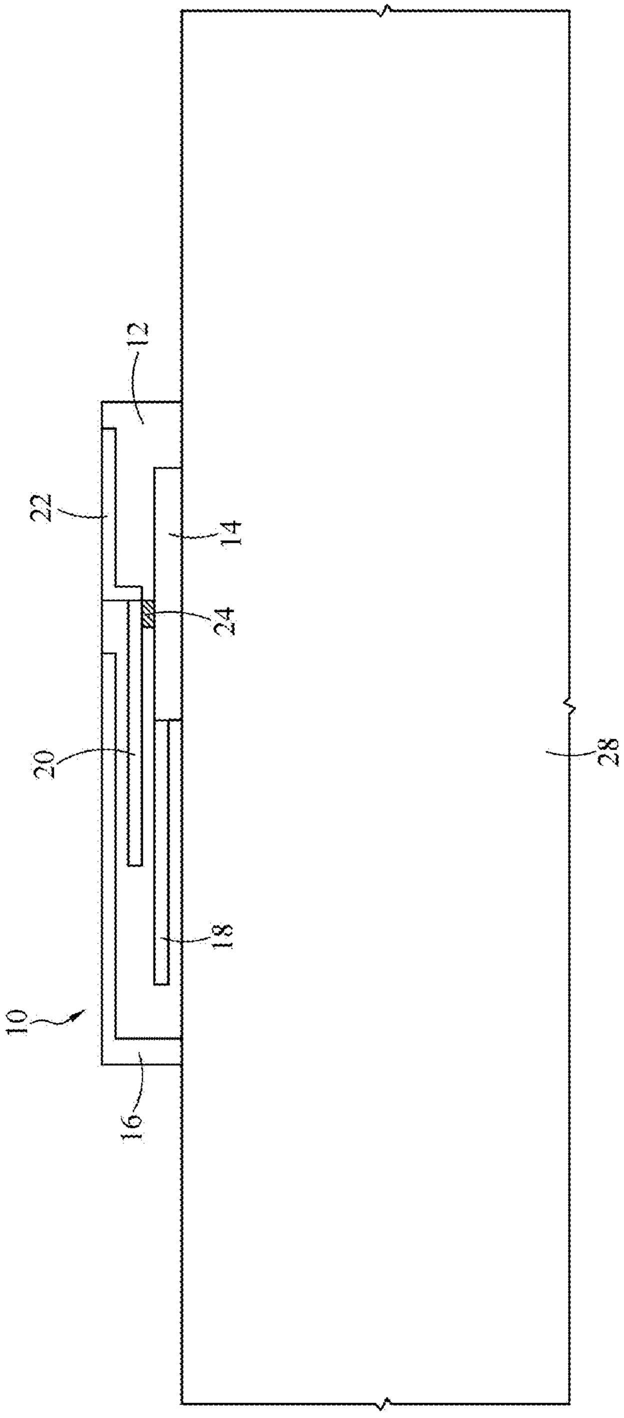
FIG. 2 is a schematic diagram between a coupled-feed multi-branch antenna system and a display panel according to an embodiment of the disclosure.
Figure 3:
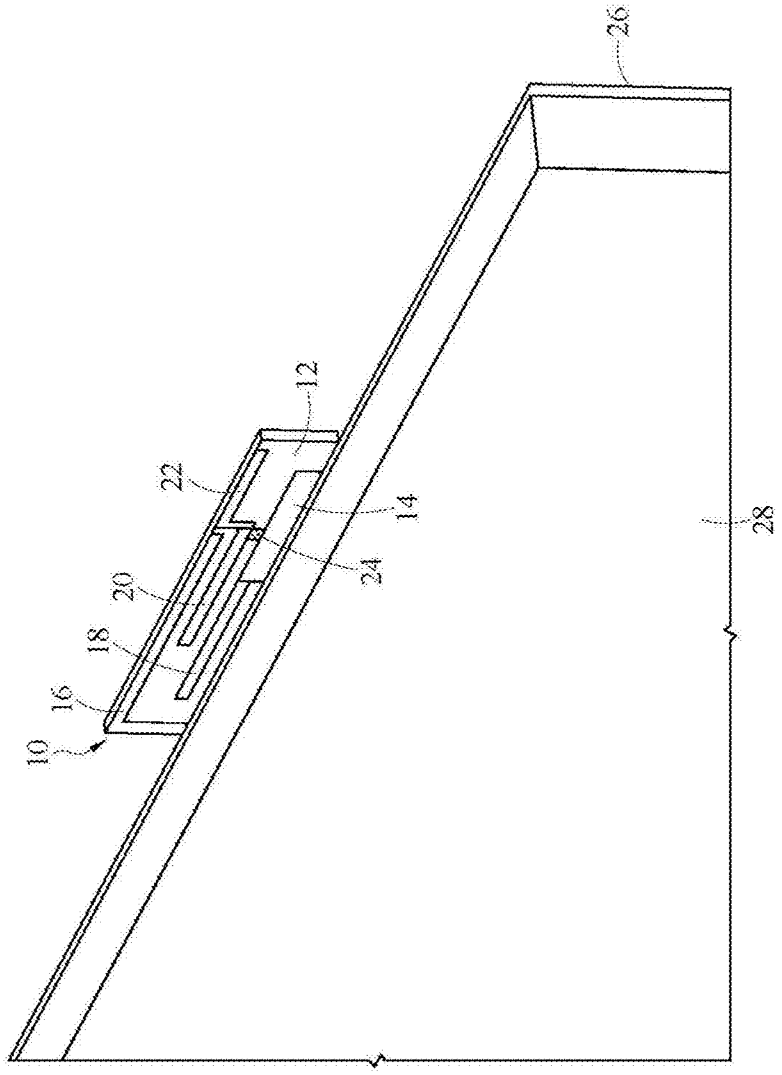
FIG. 3 is a schematic three-dimensional diagram between a coupled-feed multi-branch antenna system and a display panel according to an embodiment of the disclosure.

In an embodiment, a notebook computer is used as an example. Referring to FIG. 2 and FIG. 3 together, when the coupled-feed multi-branch antenna system 10 is installed on a cover body (not shown) of the notebook computer, the dielectric substrate 12 is aligned with an upper edge of a display panel 28 (for example, a liquid crystal display panel), and the system grounding surface 26 and the display panel 28 are spaced apart by a gap. In this case, the coupled-feed multi-branch antenna system 10 and a metal region of the display panel 28 are adjacent to and aligned with each other. The display panel 28 does not affect performance of the coupled-feed multi-branch antenna system 10. Since the second parasitic branch 18 is connected to the grounding portion 14, and is close to the system grounding surface 26, the second parasitic branch 18 still works normally in this state and is capable of resisting the interference of a grounding environment. Therefore, when an installation position of the coupled-feed multi-branch antenna system 10 is adjacent to and aligned with the display panel 28, the coupled-feed multi-branch antenna system 10 still maintains normal operation and the performance is not affected.

Figure 4:
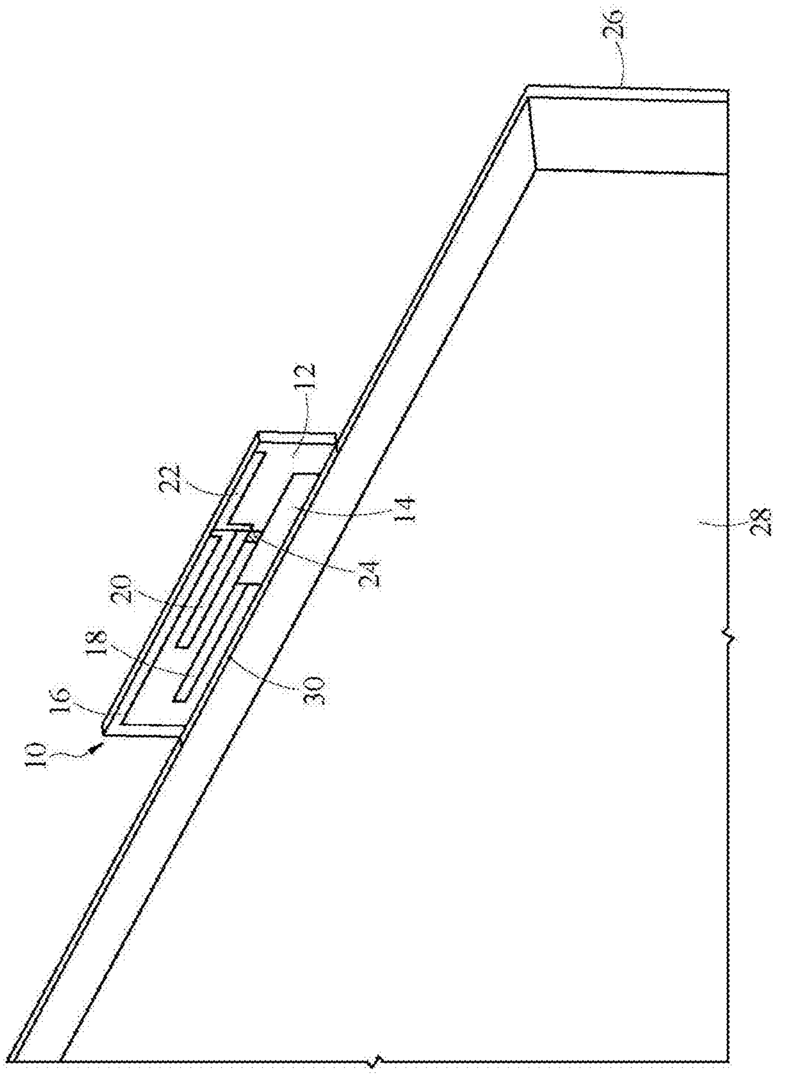
FIG. 4 is a schematic three-dimensional diagram in which a metal plate is added between a coupled-feed multi-branch antenna system and a display panel according to an embodiment of the disclosure.

In addition, to enhance a grounding effect, as shown in FIG. 4, a metal plate 30 is further used in the disclosure to connect the coupled-feed multi-branch antenna system 10, the system grounding surface 26, and the display panel 28, so that the coupled-feed multi-branch antenna system 10 has enough grounding area to ensure stability of the grounding of the coupled-feed multi-branch antenna system 10.

Figure 5:
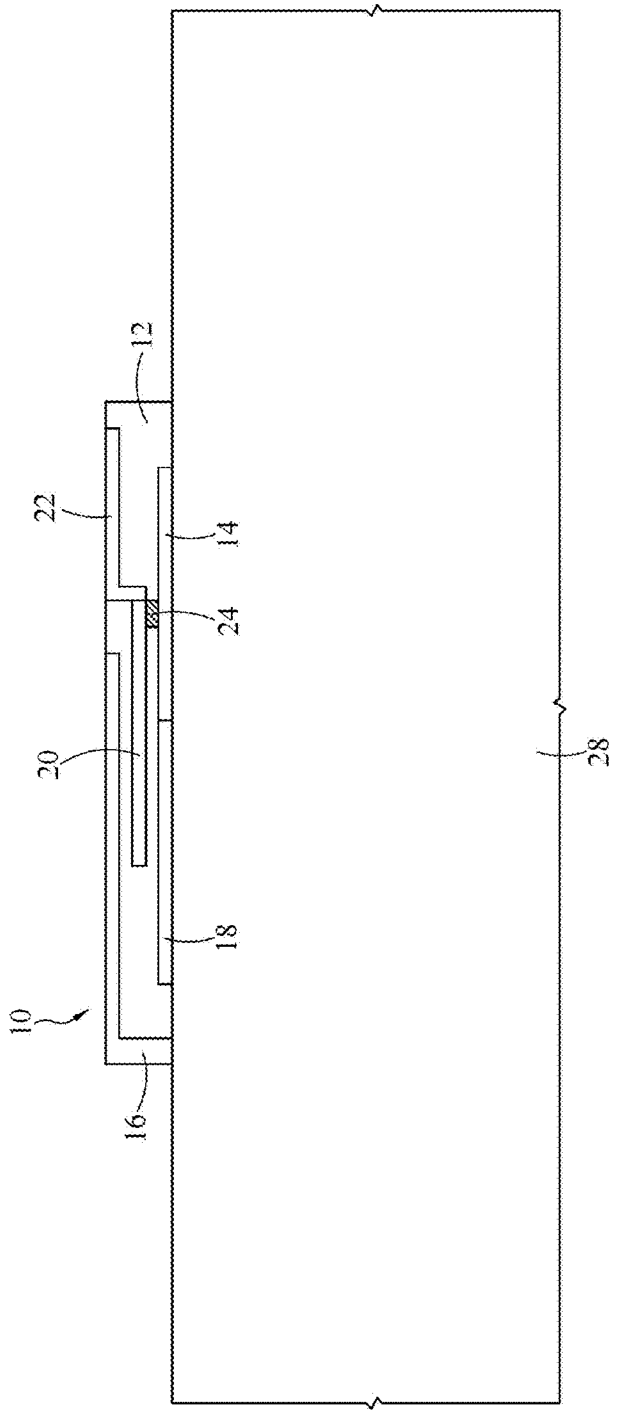
FIG. 5 is a schematic diagram between a coupled-feed multi-branch antenna system and a display panel according to another embodiment of the disclosure.
Figure 6:
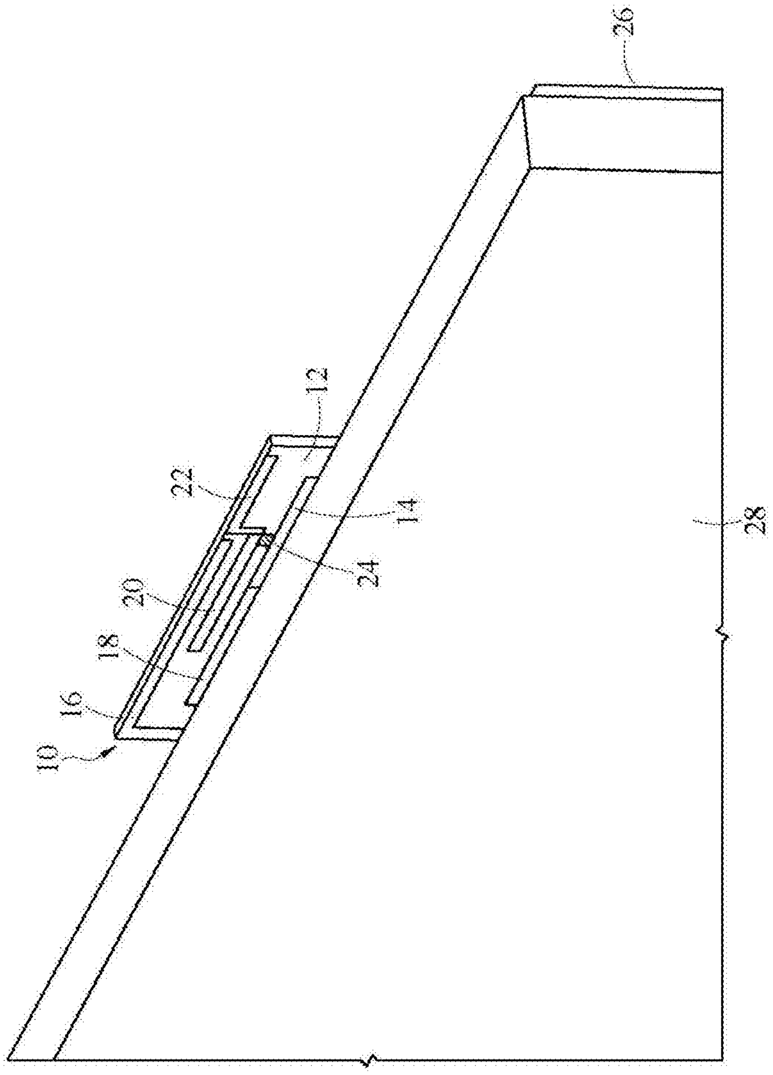
FIG. 6 is a schematic three-dimensional diagram between a coupled-feed multi-branch antenna system and a display panel according to another embodiment of the disclosure.

In another embodiment, referring to FIG. 5 and FIG. 6 together, when the coupled-feed multi-branch antenna system 10 is installed on a cover body (not shown) of a notebook computer, a part of the dielectric substrate 12 further overlaps with a display panel 28. That is, the display panel 28 covers a part of the coupled-feed multi-branch antenna system 10; system grounding surface 26 and the display panel 28 are spaced apart by a gap, which is at least 0.5 mm. In this case, a metal region of the display panel 28 covers a part of the grounding portion 14 of the coupled-feed multi-branch antenna system 10, and the display panel 28 does not affect performance of the coupled-feed multi-branch antenna system 10, so that the coupled-feed multi-branch antenna system 10 works normally.

Figure 7:
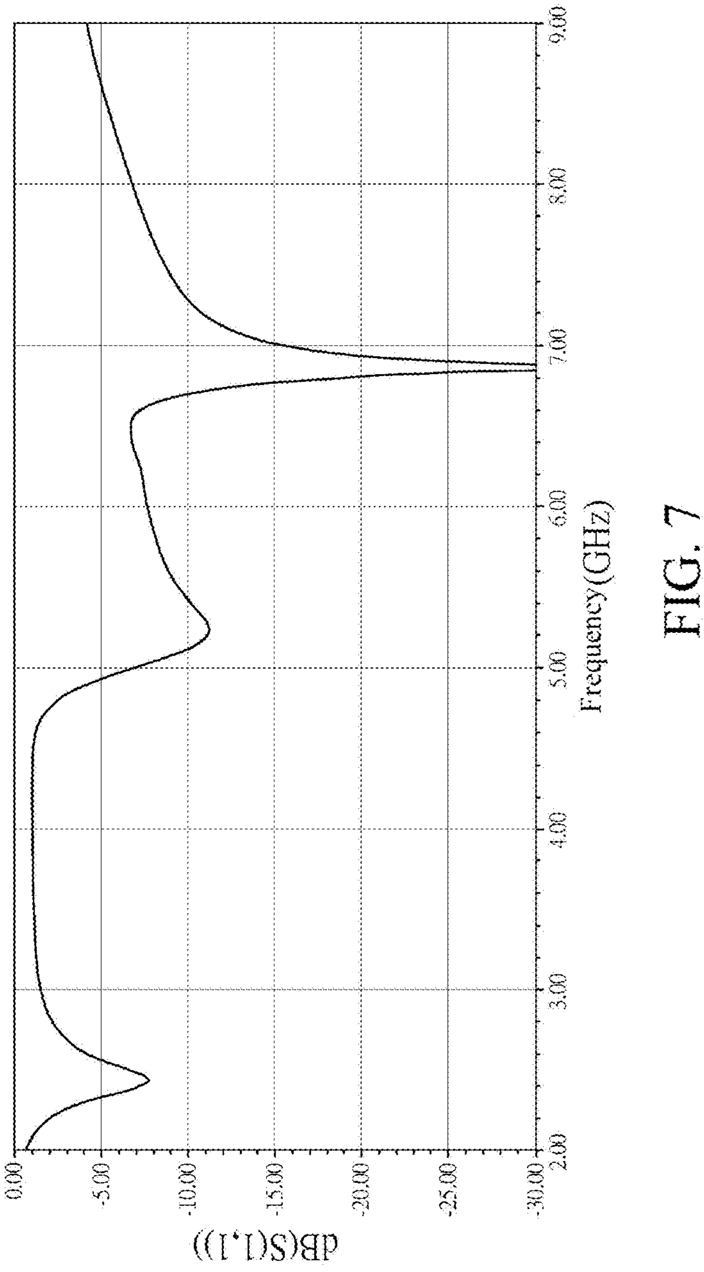
FIG. 7 is a schematic simulation diagram of a reflection coefficient (S11 parameter) generated by a coupled-feed multi-branch antenna system according to an embodiment of the disclosure.
Figure 8:
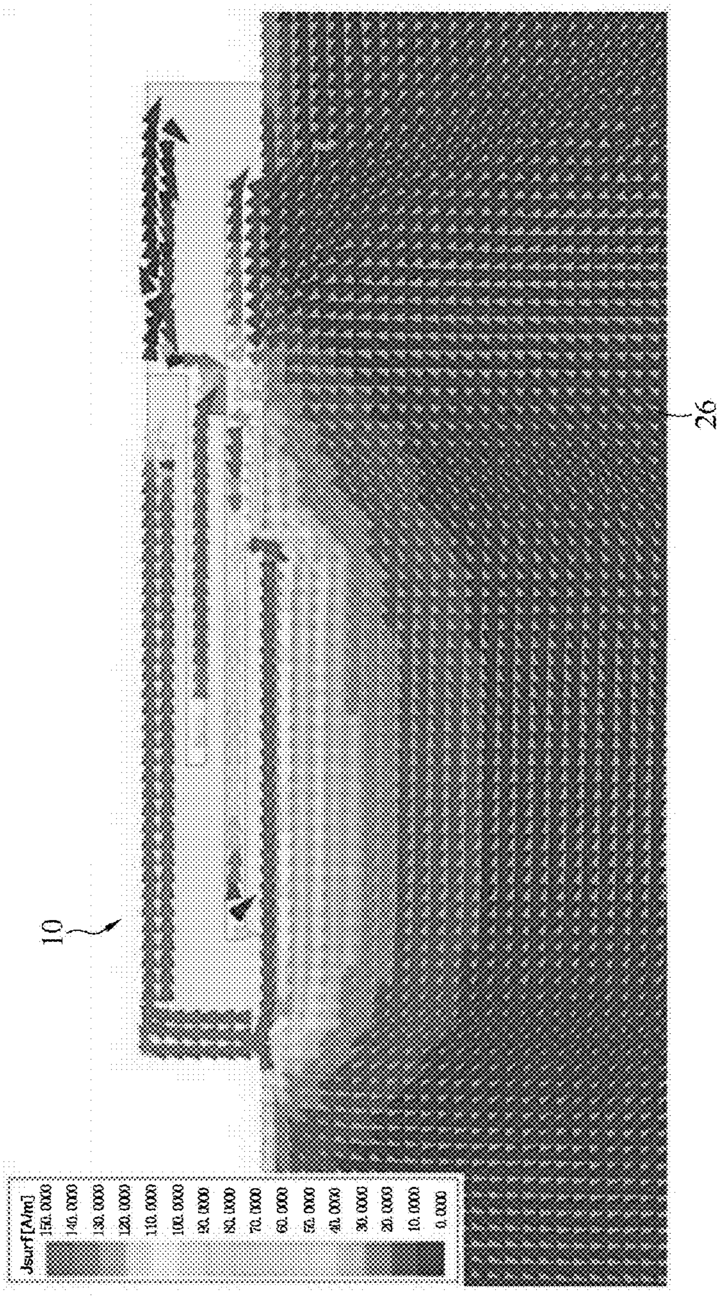
FIG. 8 is a distribution diagram of surface current paths excited at 2.45 GHz by a coupled-feed multi-branch antenna system according to an embodiment of the disclosure.
Figure 9:
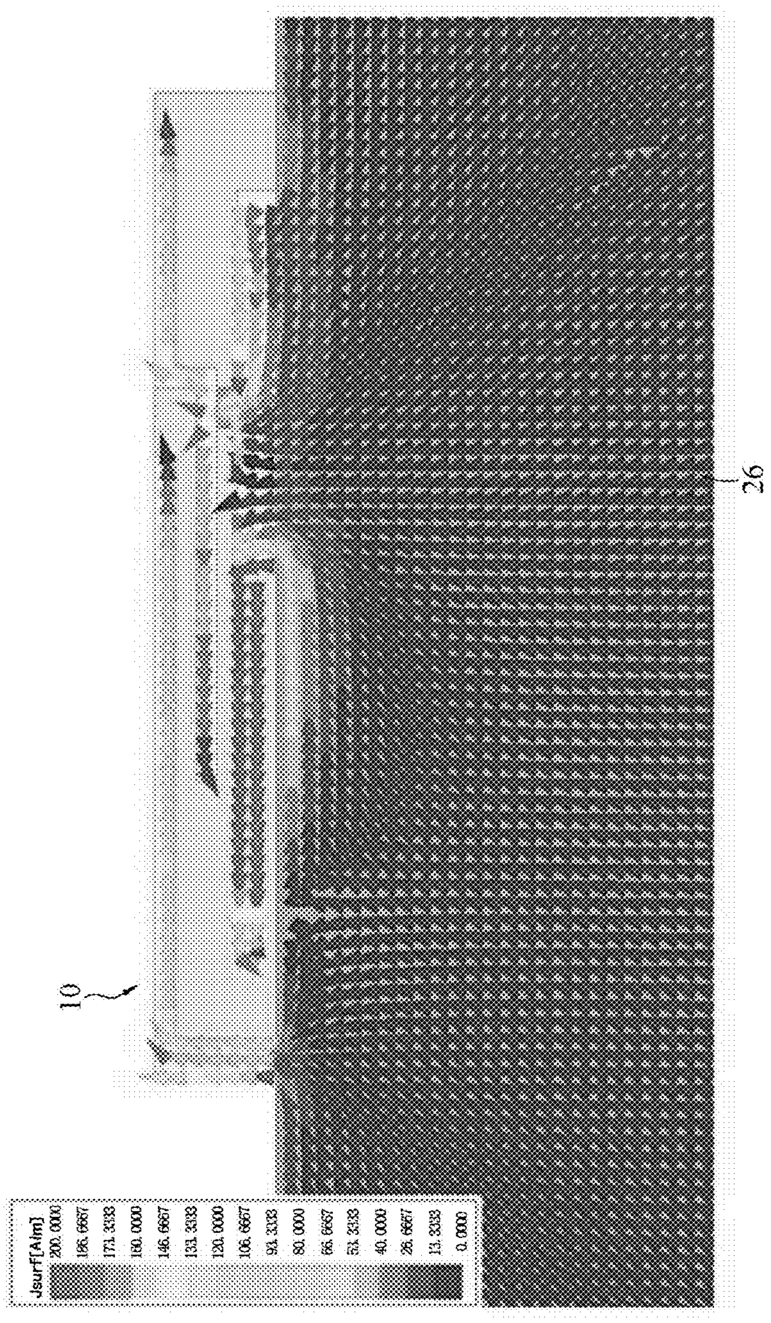
FIG. 9 is a distribution diagram of surface current paths excited at 5.3 GHz by a coupled-feed multi-branch antenna system according to an embodiment of the disclosure.
Figure 10:
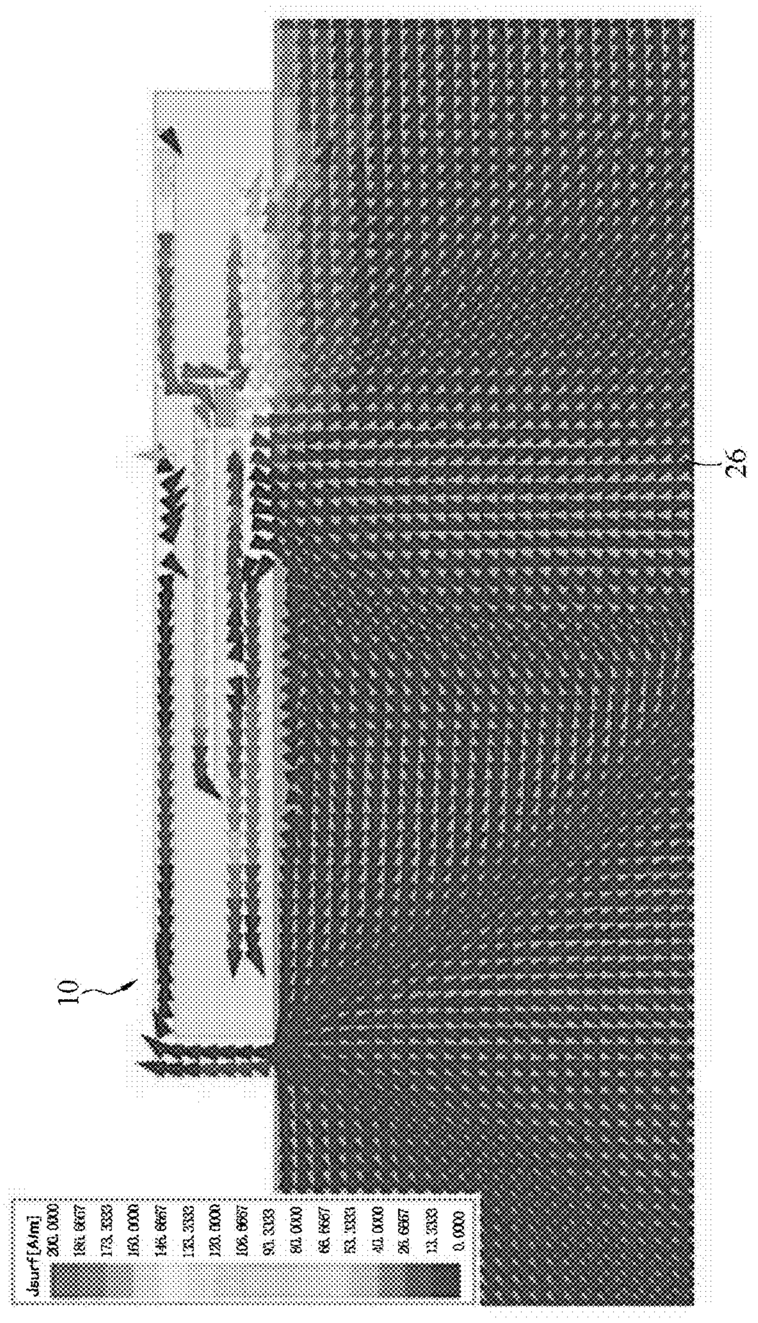
FIG. 10 is a distribution diagram of surface current paths excited at 6.86 GHz by a coupled-feed multi-branch antenna system according to an embodiment of the disclosure.

Referring to FIG. 1 and FIG. 7 together, in the coupled-feed multi-branch antenna system 10, the first metal branch 20 is coupled to and excites the first parasitic branch 16 to form an annular resonance path. A length of the annular resonance path is 0.25 times a wavelength of an operating frequency. Therefore, a first resonance mode covering 2.33 GHz to 2.56 GHz is formed near 2.45 GHz. In the first resonance mode, distribution of surface current paths of the coupled-feed multi-branch antenna system 10 is shown in FIG. 8. The second parasitic branch 18 is added on one side of the grounding portion 14, so that the second parasitic branch 18 is located between the first metal branch 20 and the system grounding surface 26. By using the second parasitic branch 18, a high-frequency resonance mode is effectively added without adding additional space. Therefore, the first metal branch 20 is coupled to and excites the second parasitic branch 18 to form a resonance path. A length of the resonance path is 0.25 times the wavelength of the operating frequency. Therefore, a second resonance mode is effectively generated at 5.3 GHz. In addition, since a current direction of the first metal branch 20 is the same as a current direction of the second parasitic branch 18, resistivity of the second parasitic branch 18 against adjacent metal coupling is enhanced. That is, an impact of the system grounding surface 26 and the display panel 28 nearby on the second parasitic branch 18 is reduced. In the second resonance mode, distribution of surface current paths of the coupled-feed multi-branch antenna system 10 is shown in FIG. 9. A resonance path is formed during high-frequency operation of the second metal branch 22. A length of the resonance path is 0.25 times the wavelength of the operating frequency. Therefore, a third resonance mode is generated at 6.86 GHz. In the third resonance mode, distribution of surface current paths of the coupled-feed multi-branch antenna system 10 is shown in FIG. 10. With a combined bandwidth of the second resonance mode and the third resonance mode, the disclosure covers 4.93 GHz to 8.61 GHz at a high-frequency band. Therefore, based on the first resonance mode, the second resonance mode, and the third resonance mode, an operation bandwidth of the coupled-feed multi-branch antenna system 10 in the disclosure satisfies a band operation range of Wi-Fi 6E (2400 MHz to 2484 MHz and 5150 MHz to 7125 MHz).

The coupled-feed multi-branch antenna system 10 provided in the disclosure achieves a good reflection coefficient. Referring FIG. 1 and FIG. 7 together, simulation analysis of S parameter (reflection coefficient) is performed during transmission of a radio frequency signal by the coupled-feed multi-branch antenna system 10. When the coupled-feed multi-branch antenna system 10 operates in a low frequency band and a high frequency band, simulation results of the S parameter are shown in FIG. 7. Curves shown in FIG. 7 indicate that, in the low operating frequency band and the high operating frequency band, all reflection coefficients (S11) shown in the figure are less than −5 dB (S11←5 dB). It is proved that reflection coefficients are good in both the low operating frequency band (first resonance mode) and the high operating frequency band (second resonance mode and third resonance mode), satisfying a frequency band range of WiFi 6E.

In the disclosure, multiple coupled-feed branches are used and parasitic branches of the grounding portion are stacked to reduce a vertical-axis height of an antenna, which only needs about 3 mm. Therefore, the antenna design at the side of a narrow-bezel screen is much less restricted. Based on this, the disclosure has three advantages. First, the disclosure meets a design requirement of a screen with an extremely narrow bezel, and is suitable for application in an electronic device with a slim-bezel screen. Second, since the antenna is far away from a system side, costs of auxiliary materials for reducing noise are saved. Third, the antenna is disposed at the screen side and is away from the human body, which reduces an excessively high SAR value, thereby greatly reducing the possibility of failed authentication of the SAR value. In addition, a network interface card is maintained in a state with a highest transmission power, to increase a data transmission speed, thereby improving a throughput of wireless communication.

Based on the above, the coupled-feed multi-branch antenna system uses a design of stacking multiple coupled-feed branches to reduce a vertical-axis height of an antenna, so as to meet a narrow bezel design requirement and expand an operable bandwidth of the antenna while the antenna is miniaturized. In this way, the antenna system supports frequency bands of 2.4 GHz, 5 GHz, and 6 GHz (2400 MHz to 2484 MHz and 5150 MHz to 7125 MHz) to effectively cover the frequency bandwidth required by the latest Wi-Fi 6E.

The foregoing embodiments are merely for describing the technical ideas and the characteristics of the disclosure, and are intended to enable those skilled in the art to understand and hereby implement the content of the disclosure. However, the scope of claims of the disclosure is not limited thereto. In other words, equivalent changes or modifications made according to the spirit disclosed in the disclosure shall still fall into scope of the claims of the disclosure.

What is claimed is:

1. A coupled-feed multi-branch antenna system, comprising:

a dielectric substrate, comprising a first long side and a second long side opposite to each other and a first short side and a second short side opposite to each other;

a grounding portion, located on the dielectric substrate, wherein the grounding portion is close to the first short side and is disposed along the first long side;

a first parasitic branch, located on the dielectric substrate, wherein the first parasitic branch is close to the second short side, and comprises at least one bend to extend along the second long side;

a second parasitic branch, located on the dielectric substrate, wherein one end of the second parasitic branch is connected to the grounding portion, and another end is parallel to the first long side and extends towards the first parasitic branch;

a first metal branch, located on the dielectric substrate, wherein the first metal branch comprises a connection end and an open end, the connection end is located on one side of the grounding portion, and the open end extends towards the second short side, causing the first metal branch to be located between the first parasitic branch and the second parasitic branch;

a second metal branch, located on the dielectric substrate, wherein one end of the second metal branch is connected to the connection end, and another end extends away from the first metal branch and is disposed along the second long side; and a signal source, located on the dielectric substrate and connected to the connection end and the grounding portion to receive or transmit a radio frequency signal.

2. The coupled-feed multi-branch antenna system according to claim 1, wherein the first metal branch is parallel to the first parasitic branch and the second parasitic branch, so that the a first coupling distance is provided between the first metal branch and the first parasitic branch, and a second coupling distance is provided between the first metal branch and the second parasitic branch.

3. The coupled-feed multi-branch antenna system according to claim 2, wherein the first coupling distance ranges from 1 mm to 0.25 mm.

4. The coupled-feed multi-branch antenna system according to claim 2, wherein the second coupling distance ranges from 1 mm to 0.25 mm.

5. The coupled-feed multi-branch antenna system according to claim 1, further comprising a system grounding surface adjacent to the first long side of the dielectric substrate and connected to the grounding portion and the first parasitic branch.

6. The coupled-feed multi-branch antenna system according to claim 5, wherein a third coupling distance is provided between the second parasitic branch and the system grounding surface.

7. The coupled-feed multi-branch antenna system according to claim 6, wherein the third coupling distance ranges from 1 mm to 0.25 mm.

8. The coupled-feed multi-branch antenna system according to claim 1, wherein the first metal branch is coupled to and excites the first parasitic branch to form an annular resonance path, and a length of the annular resonance path is 0.25 times a wavelength of an operating frequency.

9. The coupled-feed multi-branch antenna system according to claim 1, wherein the first metal branch is coupled to and excites the second parasitic branch to form a resonance path, and a length of the resonance path is 0.25 times a wavelength of the operating frequency.

10. The coupled-feed multi-branch antenna system according to claim 1, wherein the second metal branch forms a resonance path during high-frequency operation, and a length of the resonance path is 0.25 times a wavelength of the operating frequency.

11. The coupled-feed multi-branch antenna system according to claim 1, wherein a current direction of the second parasitic branch is the same as a current direction of the first metal branch.

* * * * *